Patented Mar. 24, 1925.

1,531,209

UNITED STATES PATENT OFFICE.

GEORGE M. MILLHOUSE, OF CHICAGO, ILLINOIS.

LIQUID FURNITURE POLISH.

No Drawing.   Application filed June 30, 1924.   Serial No. 723,394.

*To all whom it may concern:*

Be it known that I, GEORGE M. MILLHOUSE, a citizen of the United States, residing at Chicago, in the county of Cook and State of Illinois, have invented certain new and useful Improvements in Liquid Furniture Polish; and I do hereby declare the following to be a full, clear, and exact description of the invention, such as will enable others skilled in the art to which it appertains to make and use the same.

This invention relates to an improved liquid furniture polish, and more particularly to a formula for making the same.

An object of the invention is to provide a highly efficient and inexpensive liquid furniture polish which will be made in accordance with my hereinafter described formula.

Other objects will appear as the description proceeds.

My improved formula for making liquid furniture polish contains the following ingredients and quantity thereof: 1 gallon paraffin oil, 10 ounces of benzine, 10 ounces of turpentine, 10 ounces of gasoline, 6 ounces denatured alcohol, ½ ounce gum camphor, and 3 ounces of thirty per cent acetic acid.

With the above listed ingredients and quantities thereof approximately 1½ gallons of polish are made.

The polish is prepared by first placing the gum camphor in the alcohol until it is dissolved, and the acetic acid is mixed with the paraffin oil and shaken thoroughly. After this, all of the ingredients are then put together and thoroughly mixed by shaking, after which the same is ready for use.

It has been found that polish made from the above formula produces a very fine luster and desirable finish on wood and furniture generally.

It will be understood that while I have set forth the most desired quantities of the several ingredients for making my polish, I do not intend to limit myself to these exact amounts, as a slight variation, more or less of the ingredients, will not materially change the polish.

Having thus described my invention what I claim as new and desire to secure by Letters Patent of the United States is:—

1. A liquid furniture polish comprising approximately 1 gallon of paraffin oil, 10 ounces of turpentine, 10 ounces of benzine, 10 ounces of gasoline, 6 ounces of denatured alcohol, ½ ounce of gum camphor, and 3 ounces acetic acid, the same being thoroughly admixed.

2. The method of forming a liquid furniture polish comprising the placing of ½ ounce of gum camphor in 6 ounces of denatured alcohol until the same is dissolved, placing 3 ounces of acetic acid in 1 gallon of paraffin oil, and thoroughly admixing the same, and combining these ingredients with 10 ounces of turpentine, 10 ounces of benzine and 6 ounces of gasoline.

In testimony whereof I affix my signature.

GEORGE M. MILLHOUSE.